US007089840B2

(12) United States Patent
Freudinger et al.

(10) Patent No.: US 7,089,840 B2
(45) Date of Patent: Aug. 15, 2006

(54) FOOD SLICING APPARATUS FOR A FOOD PROCESSING LINE

(76) Inventors: Mark J. Freudinger, 448 Division St., Peotone, IL (US) 60468; David J. White, 22113 Oakton Ave., Frankfort, IL (US) 60423-8514

( * ) Notice: Subject to any disclaimer, the term of this patent is extended or adjusted under 35 U.S.C. 154(b) by 284 days.

(21) Appl. No.: 10/357,737

(22) Filed: Feb. 4, 2003

(65) Prior Publication Data

US 2004/0149098 A1 Aug. 5, 2004

(51) Int. Cl.
*B26D 7/06* (2006.01)
*A21C 9/04* (2006.01)

(52) U.S. Cl. ....................... 83/155; 83/703; 83/698.11; 99/450.1; 99/450.6

(58) Field of Classification Search .................. 83/155, 83/703, 707, 409.2, 932, 411.2, 871, 409.1, 83/435.11–435.25, 698.11; 99/450.1, 450.6, 99/450.7
See application file for complete search history.

(56) References Cited

U.S. PATENT DOCUMENTS

| | | | | |
|---|---|---|---|---|
| 3,428,102 | A * | 2/1969 | Knecht et al. | 83/88 |
| 3,633,450 | A | 1/1972 | Grote | |
| 3,683,985 | A * | 8/1972 | Verhoeven | 83/221 |
| 3,760,715 | A | 9/1973 | Grote et al. | |
| 3,906,850 | A * | 9/1975 | Papai | 99/450.7 |
| 4,060,027 | A * | 11/1977 | Jenny | 99/450.1 |
| 4,112,834 | A * | 9/1978 | Thiry | 99/450.1 |
| 4,230,007 | A | 10/1980 | Grote et al. | |
| 4,274,332 | A * | 6/1981 | Nakamura | 100/299 |
| 4,348,923 | A * | 9/1982 | Huston et al. | 83/23 |
| 4,436,012 | A * | 3/1984 | Hochanadel | 83/703 |
| 4,580,476 | A * | 4/1986 | Jones | 83/160 |
| 4,716,821 | A * | 1/1988 | Mally et al. | 99/450.1 |
| 4,771,726 | A | 9/1988 | Fitch, Jr. | |
| 4,960,025 | A | 10/1990 | Fitch | |
| 5,121,677 | A * | 6/1992 | Le Claire et al. | 99/357 |
| 5,171,367 | A | 12/1992 | Fitch, Jr. | |
| 5,458,055 | A * | 10/1995 | Fitch, Jr. | 99/450.1 |
| 5,784,936 | A * | 7/1998 | King | 83/145 |
| 6,619,170 | B1 * | 9/2003 | Kaplan | 83/167 |

* cited by examiner

*Primary Examiner*—Boyer D. Ashley
*Assistant Examiner*—Omar Flores Sánchez
(74) *Attorney, Agent, or Firm*—Joseph H. Golant; Jones Day

(57) ABSTRACT

A food slicing apparatus and components where the apparatus includes a frame and a pivotally mounted carriage. The frame mounts a height adjustable conveyor system while the carriage hosts a latch for a slice thickness adjustment cam. The carriage also supports a drive system which precisely moves a food transporting tube assembly over a base, such as pizza dough, while food is cut by a laterally moving blade mounted around two drums, one of which is adjustable to change tension in the blade. The blade is further supported by a blade guide which also guides the sliced food to the pizza dough base. The drive system includes a servomotor, a group of gears, a crank connected to the gears, a cam roller and a cam follower plate with a slot. The cam follower plate is connected by a quick connect and disconnect connector to the food tube assembly. The result is a compact, efficient slicing apparatus with a small footprint that is usable in a food processing line. The apparatus is easy to clean and the food tube assembly is easily exchanged with an assembly having a different arrangement of the food tubes.

15 Claims, 16 Drawing Sheets

FOOD SLICING APPARATUS FOR A FOOD PROCESSING LINE

BACKGROUND OF THE INVENTION

1. Field of the Invention

The present invention relates to a food slicing apparatus for use in a food processing line and more particularly to a food slicing apparatus for use in an assembly line for creating such food products as frozen pizza; this disclosure also concerns various component parts of the slicing apparatus.

2. Description of the Related Art

Many food products such as frozen pizza are processed or "manufactured" on an assembly line where a round dough base passes through several stations where sauce, cheese and toppings are deposited before the combination is boxed, frozen and shipped off to supermarkets for sale to consumers. It is well understood that all such machines and devices must be reliable and relatively inexpensive to be commercially viable. Such machines also must be easily cleaned as required by local health codes. Prior machines tend to be expensive, overly large, not easily cleaned and not reliable. Therefore, there is a need for a better apparatus than now exists.

BRIEF SUMMARY OF THE INVENTION

The difficulties encountered by previous machines have been overcome by the apparatus disclosed here. What is disclosed in general is a slicing apparatus for a processing assembly line including a frame, a conveyor mounted to the frame, a cutting blade moving laterally across the frame, a carriage mounted on the frame, a tube assembly for holding food or other product to be sliced and a compact drive mechanism.

A major advantage of the slicing apparatus disclosed herein is that the apparatus is compact, easily cleaned and very reliable. Additional features of the slicing apparatus are that the apparatus has a relatively small footprint and because of clever design is simply constructed and relatively inexpensive. Construction techniques achieve an efficient and a compact design while providing for functions that make for a versatile, easily adjustable and effective machine. For example, the apparatus may be quickly and easily disassembled to allow for cleaning.

A more complete understanding of the present invention and other objects, advantages and features thereof will be gained from a consideration of the following description of a preferred embodiment read in conjunction with the accompanying drawing provided herein. The preferred embodiment represents an example of the invention which is described here in compliance with Title 35 U.S.C. section 112 (first paragraph), but the invention itself is defined by the attached claims.

DETAILED DESCRIPTION OF A PREFERRED EMBODIMENT OF THE INVENTION

Figure 1:
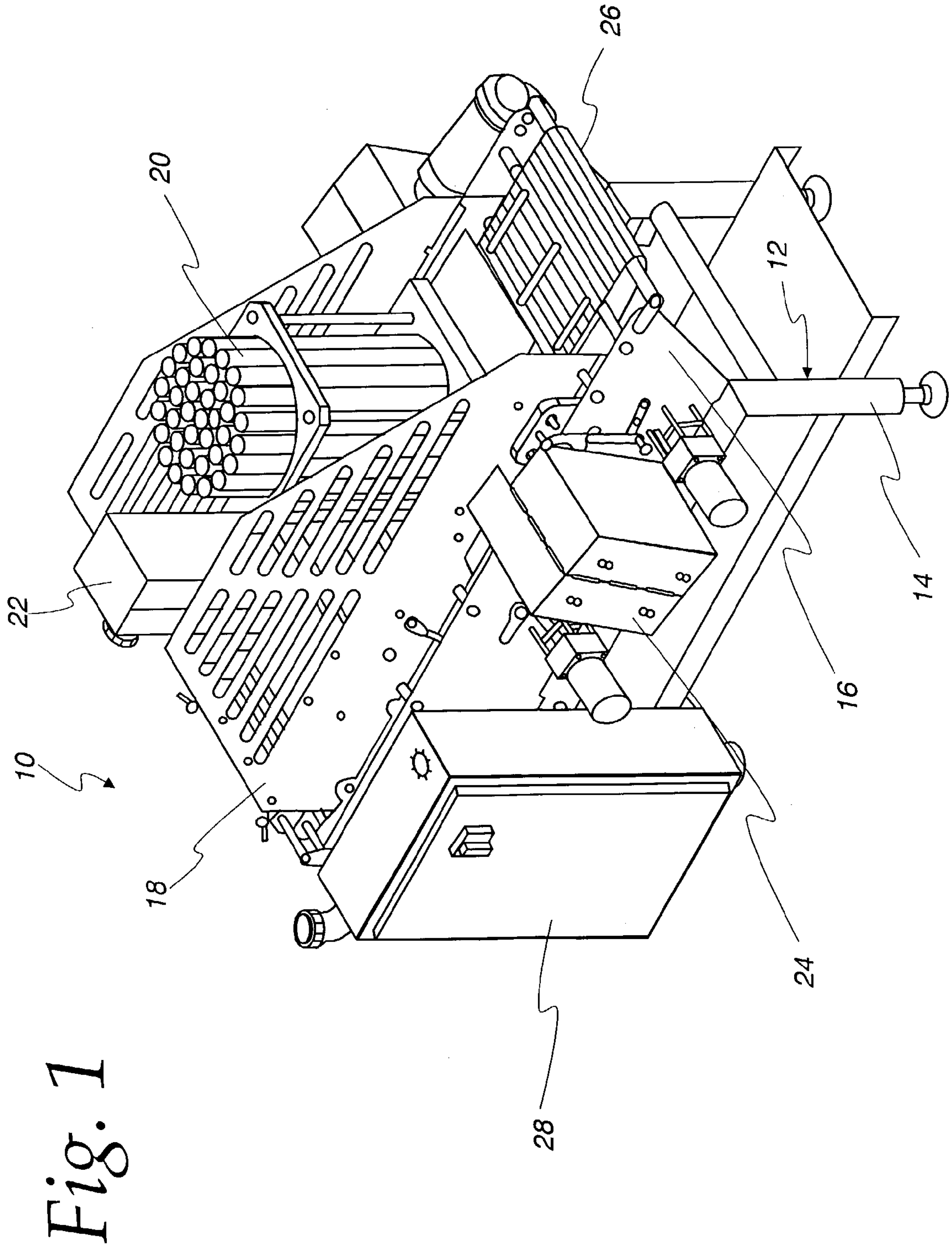
FIG. 1 is a downward looking isometric view of the slicing apparatus for a food processing line which is described herein.

While the present invention is open to various modifications and alternative constructions, the preferred embodiment shown in the various figures of the drawing will be described herein in detail. It is understood, however, that there is no intention to limit the invention to the particular embodiment, form or example disclosed. On the contrary, the intention is to cover all modifications, equivalent structures and methods, and alternative constructions falling within the spirit and scope of the invention as expressed in the appended claims, pursuant to Title 35 U.S.C. section 112 (second paragraph).

Referring now to FIGS. 1–4, the food slicing apparatus 10 is shown fully assembled and includes a frame 12 having a lower stand portion 14 and an upper support portion 16. Pivotally mounted to the frame is a carriage 18. Mounted to the carriage is a slideable food transporting assembly 20 and a drive assembly 22. Also mounted to the frame is a cutting blade system 24, a conveyor system 26, an electronic control 28 to control the operation of the food slicing apparatus and an activation control box 30.

Figure 5:
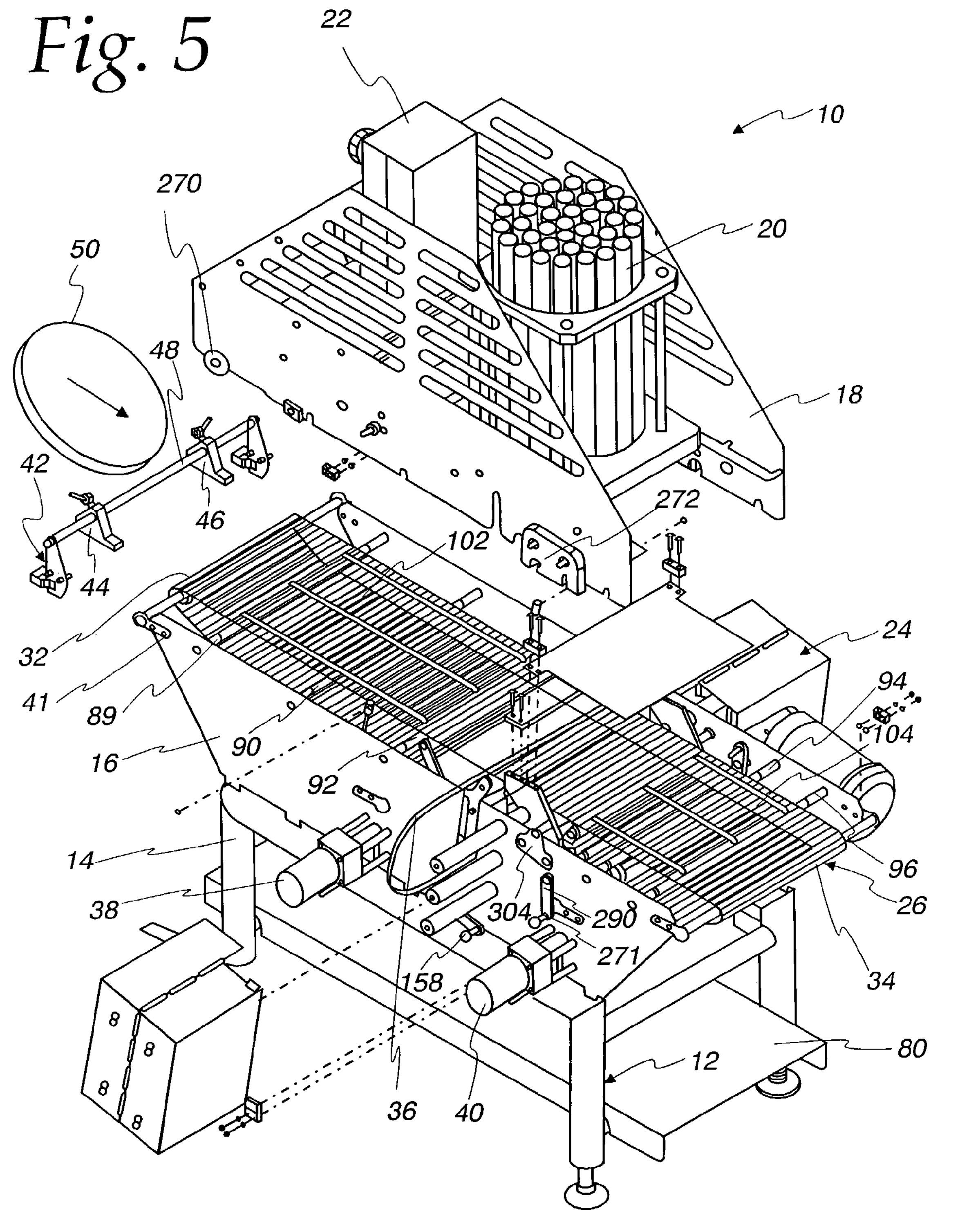
FIG. 5 is an exploded isometric view of a portion of the slicing apparatus shown in FIG. 1.

An exploded view of the food slicing apparatus is illustrated in FIG. 5, but without the electronic program control and activation control box. For purposes of orientation, the conveyor system 26 may be viewed as having an upstream portion 32 and a downstream portion 34 separated by a slicing blade 36 which is part of the cutting blade system 24. An upstream motor 38 is attached to the upper support portion 16 of the frame 12 for operating the upstream portion of the conveyor system and a downstream motor 40 is attached to the frame for operating the downstream portion of the conveyor system. Also attached to the frame at the upstream portion 32 is an infeed guide 42 having two adjustable guide blocks 44, 46 movable on a rod 48 for locating a "base" 50 upon which food will be deposited. The base may be a food item, such as pizza dough, or the base may be a paper disc or a plastic substrate. It is to be noted that while the slicing apparatus is designed specifically for food, non-food uses may be made of the apparatus. The arrow 51 is drawn on the base to indicate the direction of movement of the base on the conveyor system.

Figure 6:
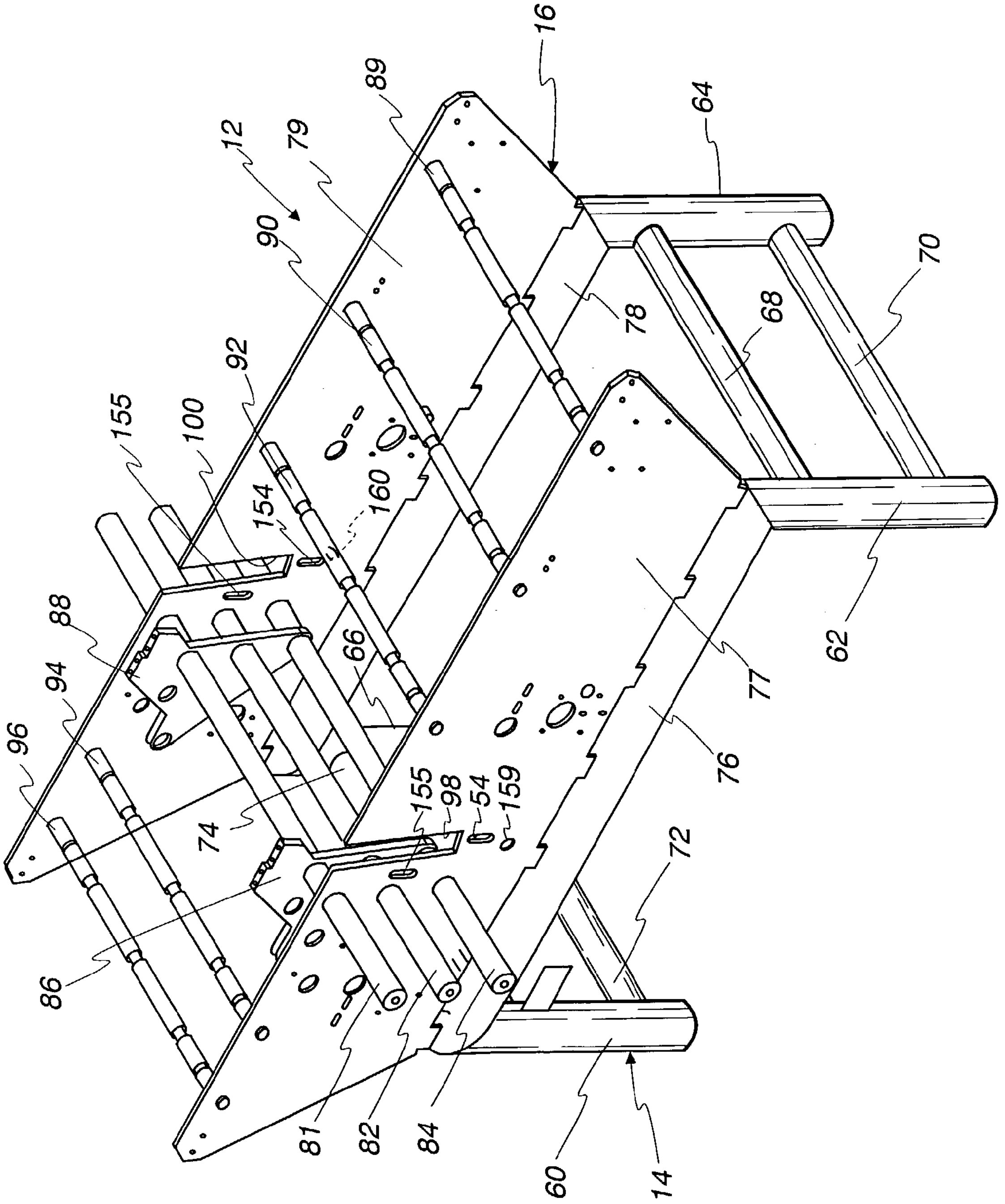
FIG. 6 is a downward looking, enlarged isometric view of the frame of the slicing apparatus, where the frame is rotated 180 degrees from the previous figures.

The simple construction and reliable design of the slicing apparatus is exemplified by referring to FIG. 6 which illustrates the frame 12 in more detail. The frame in FIG. 6 is rotated about one hundred eighty degrees from the views in FIGS. 1–5. The frame 12 includes the lower stand portion 14 which is formed of four tubular legs 60, 62, 64, 66, four tubular cross members 68, 70, 72, 74 and two side tubes 76, 78. The frame also includes two walls 77, 79 of the upper support portion 16. All of these elements have been welded together for strength and lightness as well as for ease of cleaning. The lack of nuts and bolts eliminates the gaps and spaces inherently present when nuts and bolts are used. Germs and decay which breed in such gaps and spaces are therefore eliminated. A catch pan 80, FIGS. 1 and 5, is supported on the lower cross members 70, 72 to prevent any drippings from reaching the floor on which the slicing apparatus stands.

Also welded to the frame are three mounting rods 81, 82, 84 to which are welded two support plates 86, 88 and five grooved shafts 89, 90, 92, 94, 96. The three mounting rods extend beyond the sidewalls 77, 79 for supporting the cutting blade system 24. The five shafts support an upstream wire conveyor belt 102, FIG. 5, and a downstream wire conveyor belt 104. Formed in the frame sidewalls are a number of openings and slots and two long slanted slots 98, 100, FIG. 6, through which the cutting blade is accommodated. The frame, mounting rods, the support plates and the grooved shafts are all formed of stainless steel to prevent rust and to allow the entire apparatus to be conveniently cleaned by being "hosed down" with a cleaning solution.

Figure 7:
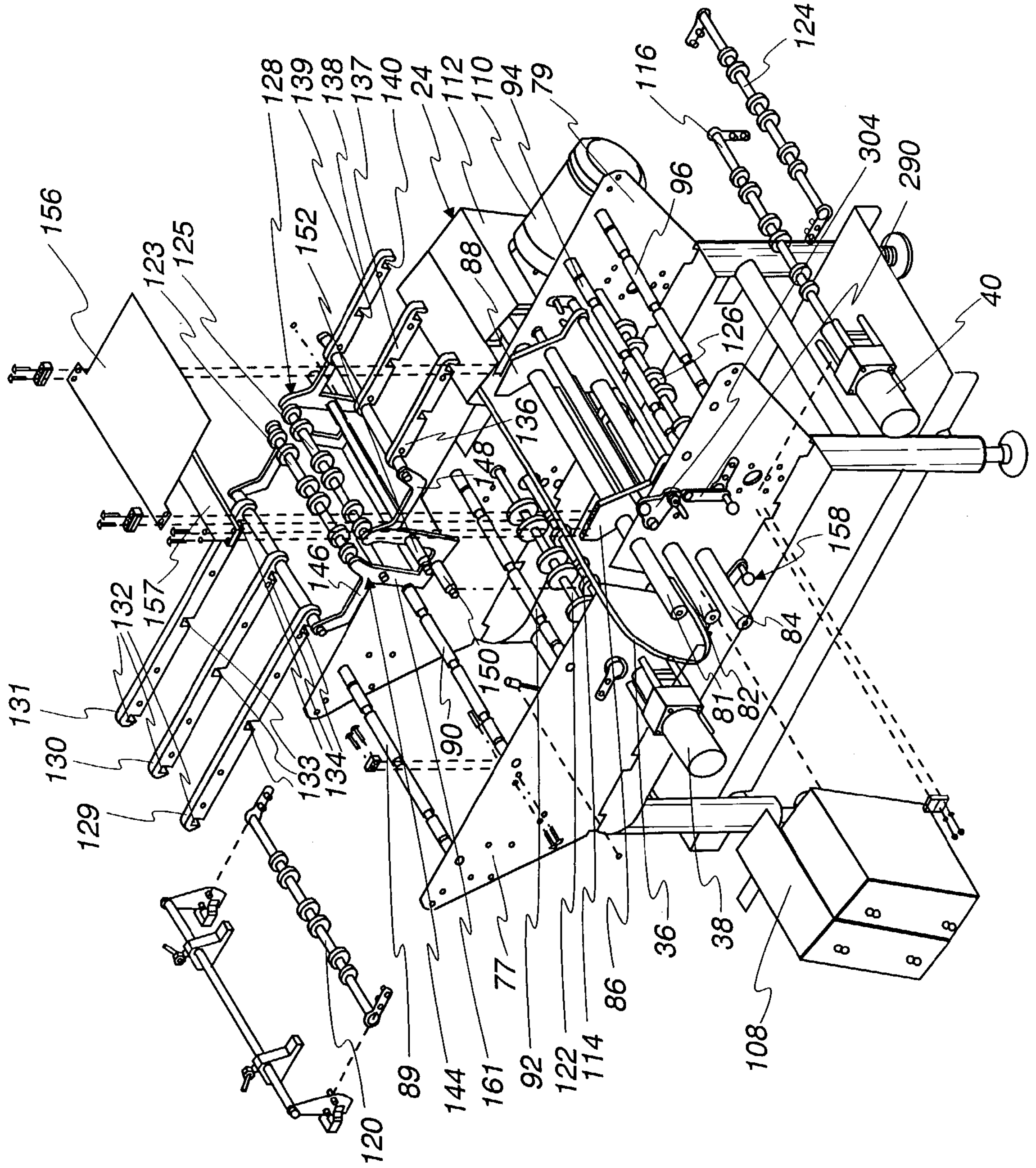
FIG. 7 is a downward looking, exploded view of the frame with portions of a conveyor system and a blade mounting system including a blade tensioning assembly.

Additional elements, in exploded view, are shown added to the frame in FIG. 7 and account for some of the holes formed in the sidewalls 77, 79. It should be noted that the frame has been again reoriented one hundred and eighty degrees from the view of the frame in FIG. 6, however, the orientation of FIG. 7 is now the same as the orientation of the frame in FIG. 5.

Figure 27:
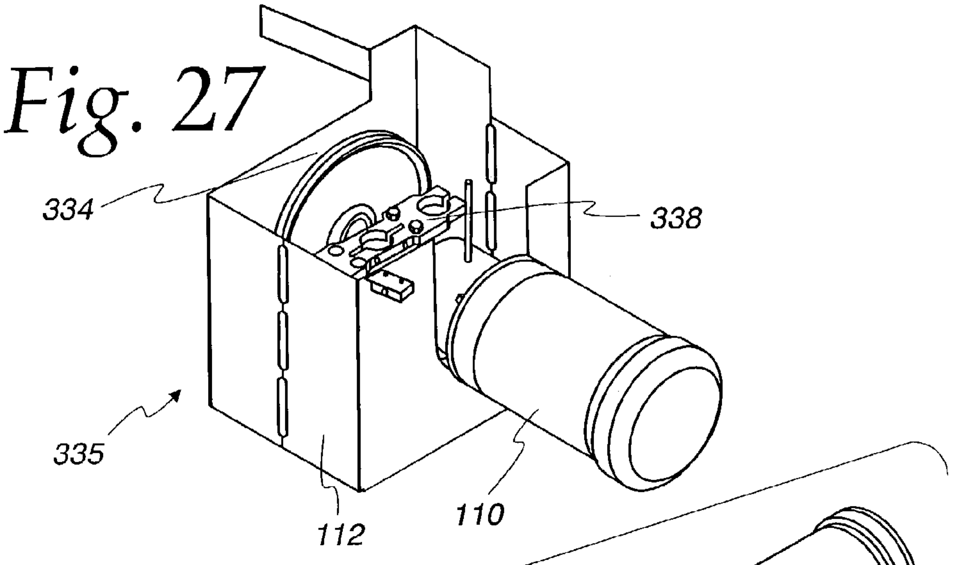
FIG. 27 is an isometric view of a driver drum assembly.
Figure 28:
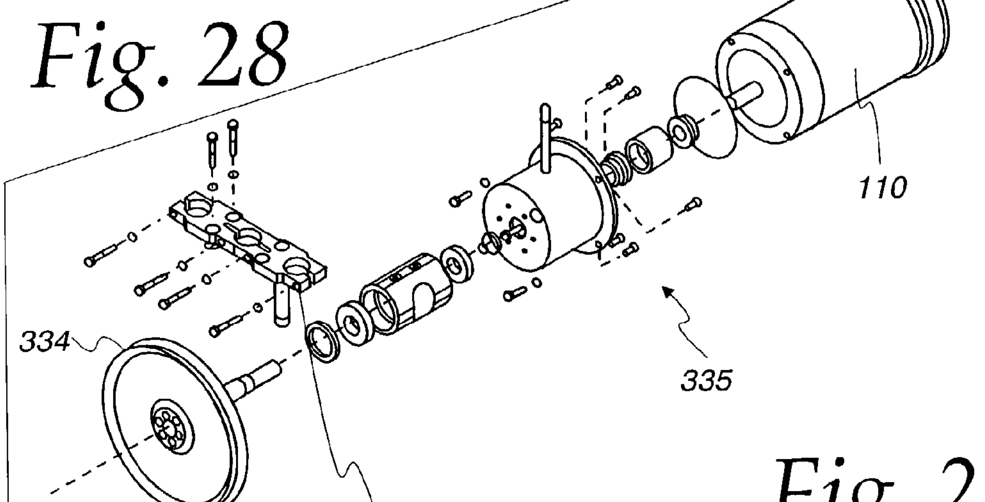
FIG. 28 is an exploded isometric view of the driver drum assembly rotated ninety degrees from the view shown in FIG. 27.
Figure 28:
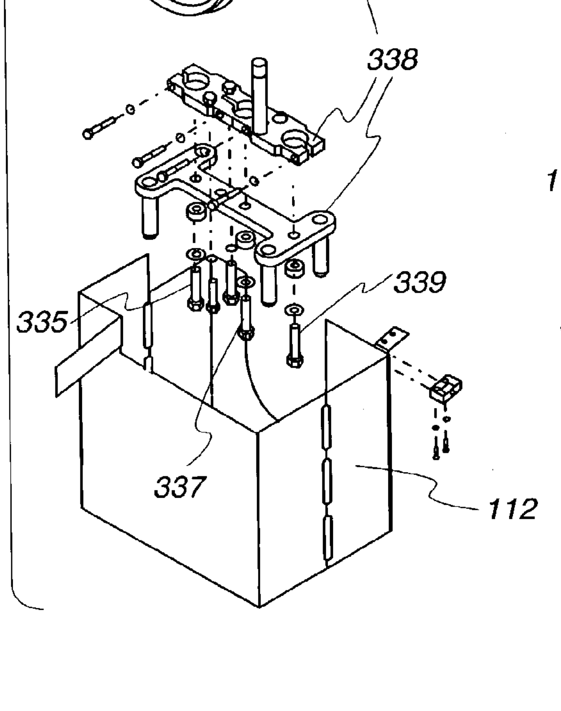
Figure 29:
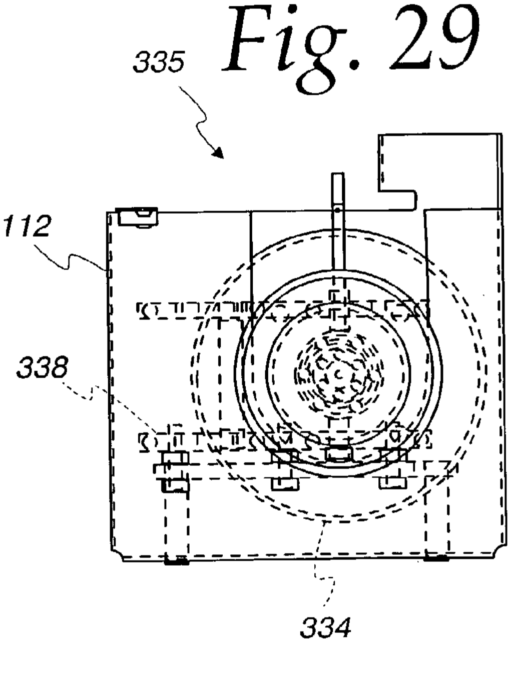
FIG. 29 is an elevational view of the driver drum assembly.
Figure 30:
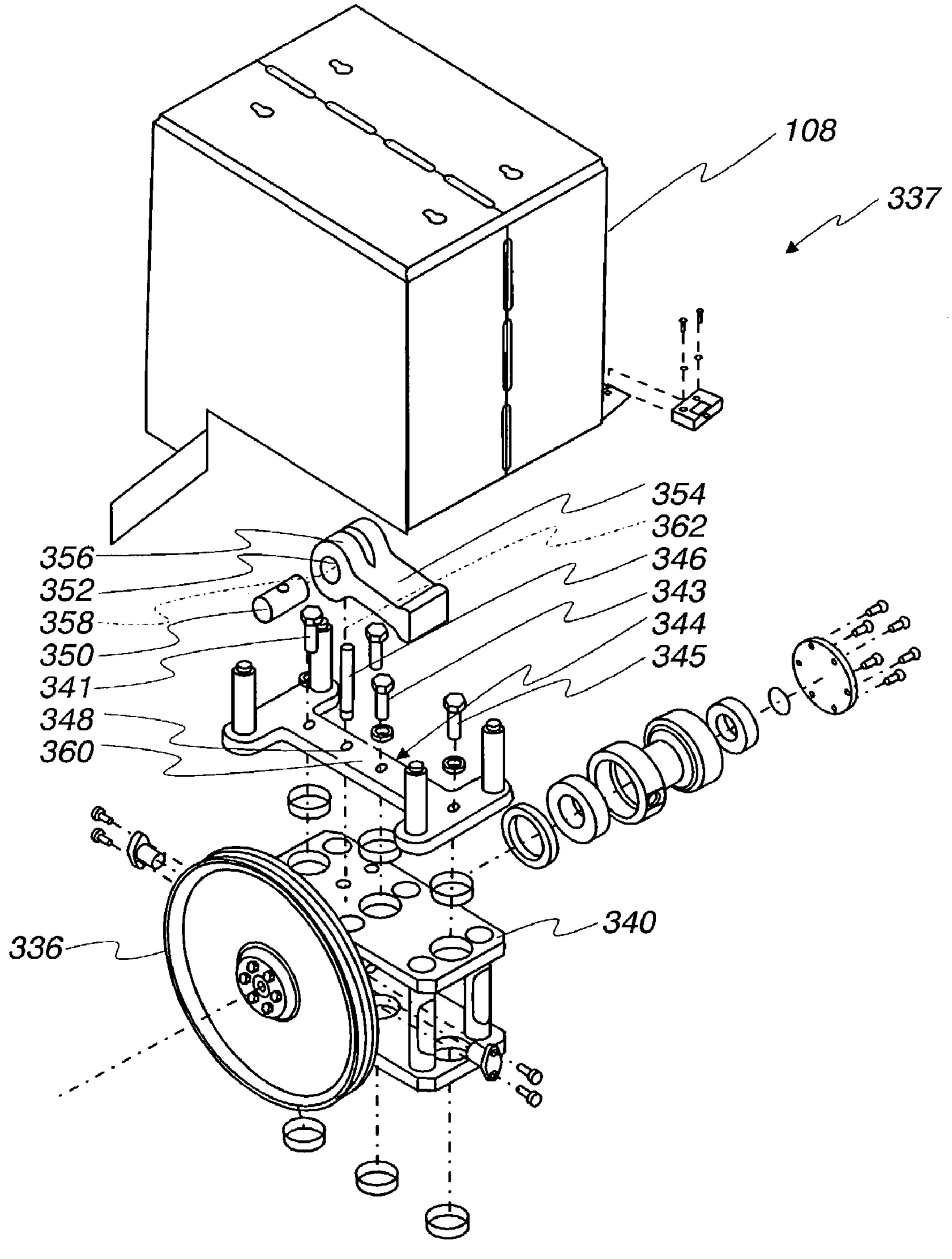
FIG. 30 is an exploded isometric view of a driven drum assembly.
Figure 31:
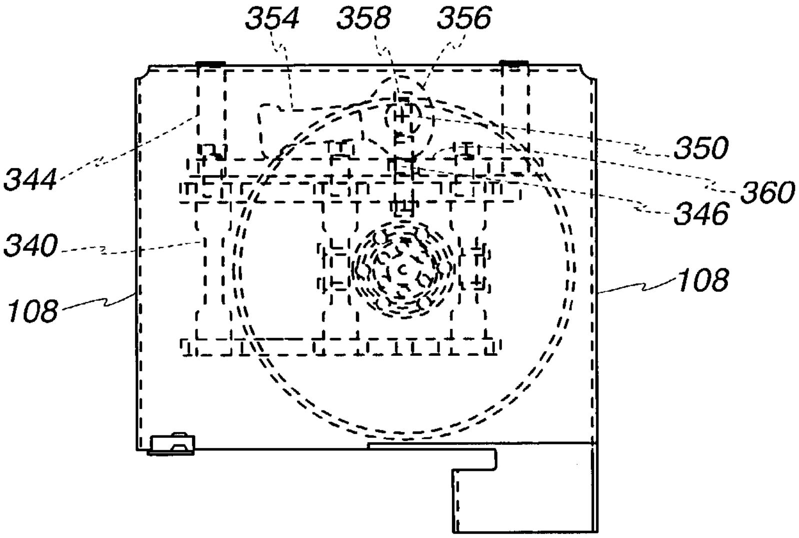
FIG. 31 is an elevation view of the driven drum assembly.
Figure 32:
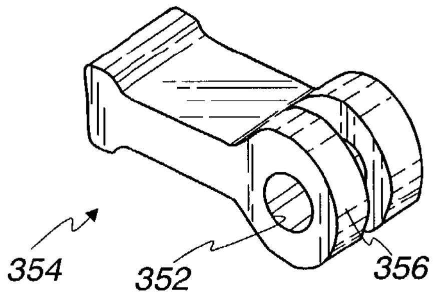
FIG. 32 is an enlarged isometric view of a blade tensioner handle and cam.
Figure 33:
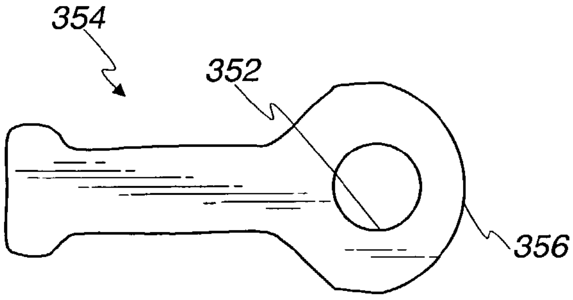
FIG. 33 is an enlarged side elevation view of the blade tensioner handle and cam.

In FIG. 7, the cutting blade system 24 is depicted mounted to the frame upon the three rods 81, 82, 84. The cutting blade system includes the slicing blade 36 mounted to a driver drum (described below in relation to FIGS. 27–29) and a driven drum (described below in relation to FIGS. 30 and 31). A tensioning mechanism, to be described below, is connected to the driven drum located within an enclosure 108. A drive motor 110 is connected to the driver drum under an enclosure 112. The upstream motor 38 is connected to a sprocket shaft 114 which is used to drive the upstream wire conveyor belt 102, FIG. 5 and the downstream motor 40 is connected to a sprocket shaft 116 which is used to drive the downstream wire conveyor belt 104. Idler sprocket shafts 120, 122, 123 are part of the upstream conveyor and idler sprocket shafts 124, 125, 126 are part of the downstream conveyor.

Mounted between the sidewalls of the frame on the five grooved shafts 89, 90, 92, 94, 96 is a conveyor adjustment slide 128 of a conveyor lift system. The conveyor slide includes three upstream extending rails 129, 130, 131 each with three notches 132, 133, 134 which match the grooves in the groove shafts 89, 90, 92. Extending downstream are three shorter rails 136, 137, 138, each with two notches 139, 140 for engaging the two downstream grooved shafts 94, 96. A middle portion of the conveyor slide has a U-shaped body 144 with oppositely extended arms 146, 148. The U-shaped body supports the two idler sprocket shafts 123, 125 which cooperate with the other sprocket shafts to guide and move the wire conveyor belt. Two support shafts 150, 152 are welded to the U-shaped body and extend laterally to be supported within vertically oriented slots 154, 155, FIG. 6, in the sidewalls 77, 79 of the frame. The support shafts allow the conveyor adjustment slide to move vertically and thereby change the vertical height of the wire belts relative to the frame just upstream of the slicing blade 36.

Figure 8:
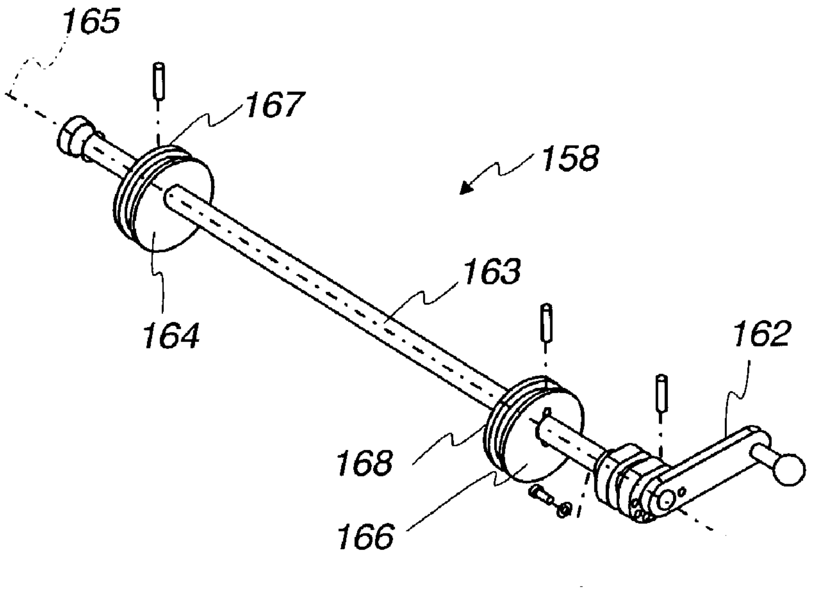
FIG. 8 is an isometric view of a conveyor lift shaft.
Figure 9:
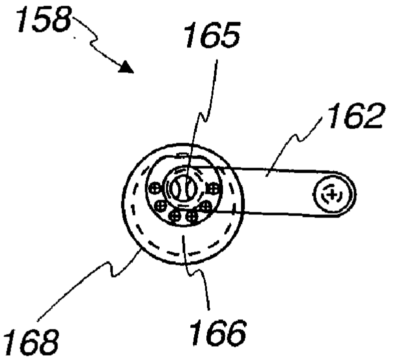
FIG. 9 is an elevation view of the conveyor lift shaft.

A lift shaft assembly 158, FIGS. 7, 8 and 9, also part of the conveyor lift system is also attached to the sidewalls of the frames in the openings 159, 160, FIG. 6, so as to be just beneath a base 161 of the U-shaped body 144 and the support shaft 150. The lift shaft assembly includes a rotatable handle 162, a shaft 163 and two cams 164, 166. The cams are in the forms of rollers which are mounted off-set as seen in FIG. 9. When the shaft 163 is rotated by the handle 162, the distance between an axis of rotation 165 and outer surfaces 167, 168 of the cams 164, 166 will change. The shaft is located beneath the conveyor adjustment slide 128 so that the cams push the conveyor adjustment slide upwardly or allow it to drop. The lift shaft assembly 158 and the conveyor adjustment slide 128 form a lift assembly system. Moving the conveyor slide upwardly or downwardly allows the conveyor system to compensate for different thicknesses in the passing bases. Different height pizza dough, for example, may be accommodated. It is desirable to have the slicing blade as close as possible to a passing base so that the newly sliced items lay down on or fall immediately onto the base. Falling a minimal distance helps ensure that the cutting component of force, acting in the direction of the moving blade, does not carry the sliced items laterally so as to upset the planned pattern of the sliced items on the base, such as pepperoni slices on a pizza.

Attached to the two support plates 86, 88 is a horizontally disposed food support plate 156 and a blade guide 157. All of the elements thus far identified including the conveyor slide, the support plate, the blade guide, the shaft 163 and the handle 162 are made of stainless steel. The cams 164, 166 may be made from Delrin.

Figure 10:
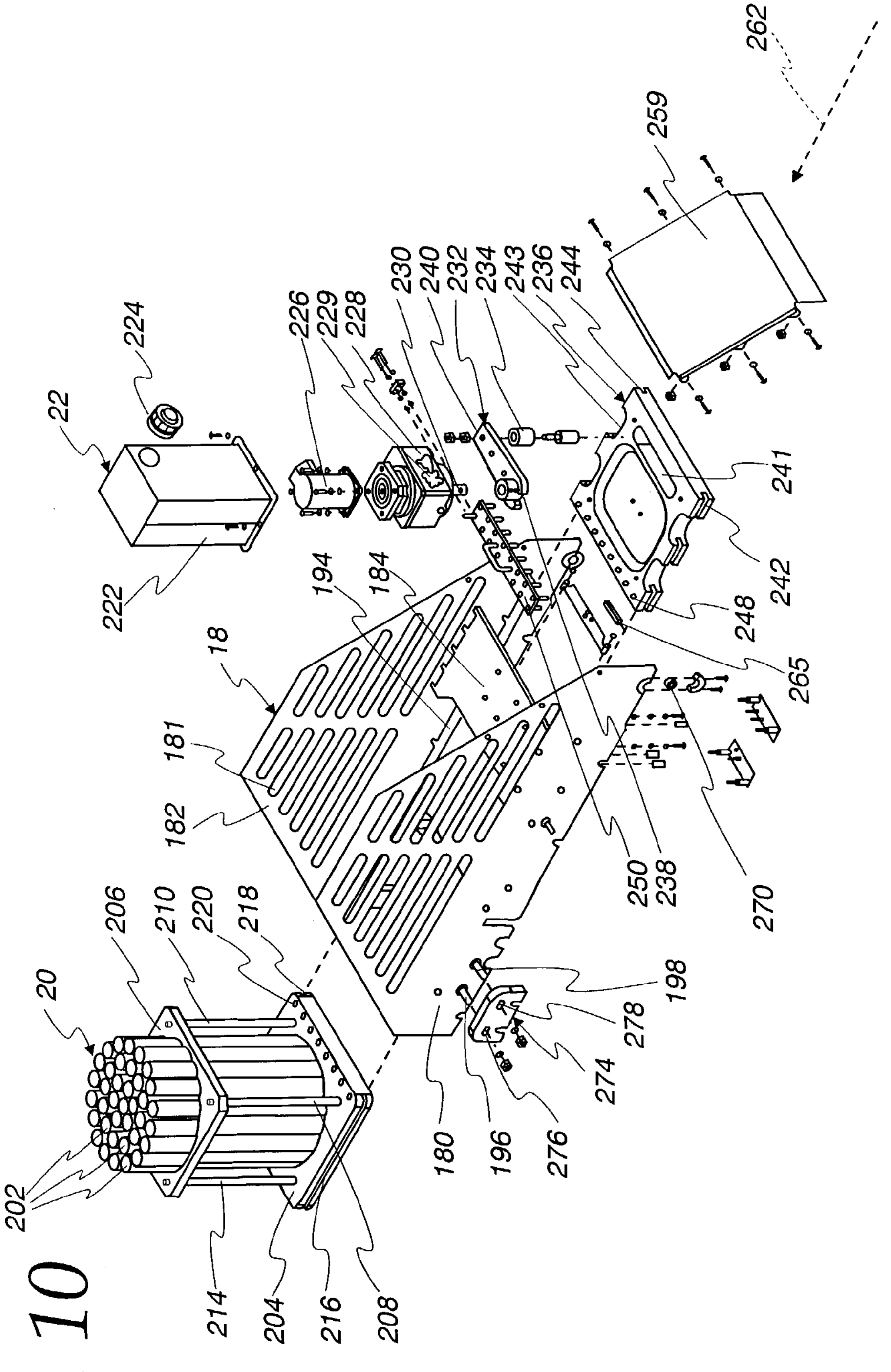
FIG. 10 is a downward looking, exploded isometric view, partially diagrammatic, of a carriage system, the tube assembly and the drive system.
Figure 12:
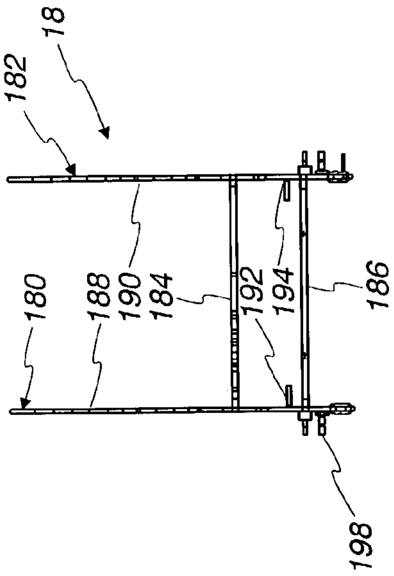
FIG. 12 is a front elevation view of the carriage.
Figure 11:
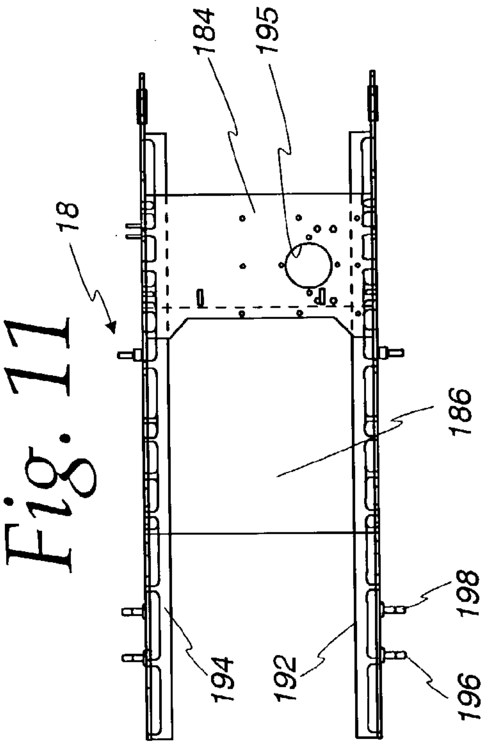
FIG. 11 is a top plan view of the carriage.

The advantages of compact design and ease of disassembly for cleaning purposes may be appreciated by reference to FIGS. 10–12. The carriage 18 is illustrated in a view which is rotated one hundred and eighty degrees from the views shown in FIGS. 1–5. The carriage has two sidewalls 180, 182, each with a series of horizontal slots, such as the slot 181 to lessen weight because the carriage is also made of stainless steel. Connecting the two sidewalls is a horizontal drive system support plate 184 and a product support plate 186, FIGS. 11 and 12. Along inside surfaces 188, 190 of the sidewalls 180, 182 are horizontally extending guide rails 192, 194. The guide rails and support plates are all stainless steel and are welded to the sidewalls. Also welded to sidewalls are pairs of mounting studs 196, 198 for supporting a latch assembly slide blocks to be described below. The drive system 22 is mounted to the support plate 184 extends through an opening 195 in the support plate.

Figure 13:
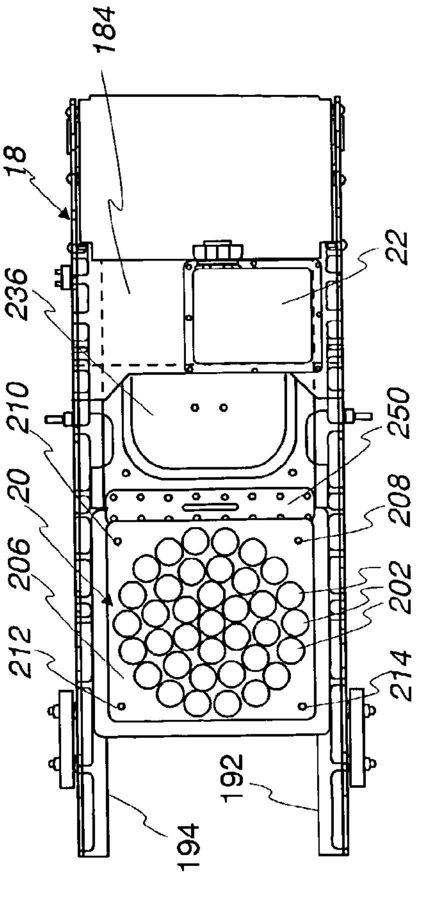
FIG. 13 is a top plan view of the carriage, the drive system, the tube assembly and a connector.

Mounted to the guide rails is a food tube assembly 20, FIGS. 10 and 13, which includes a bundle of tubes 202 supported by a bottom panel 204 and a top panel 206 fastened to each other by four tie rods 208, 210, 212, 214. The tube assembly transports food to be sliced to the blade 36. The bottom panel 204 has two lateral rail receiving grooves 216, 218. These allow the tube assembly to slide along the guide rails 192, 194 of the carriage. The tubes are stainless steel but the bottom and top panels 204, 206 may be ultra-high molecular weight resin. Close to the upstream edge of the bottom panel are a series of holes 220; eight are shown but more or less may be used. It should be noted that the tube assembly 20 is a self-supporting unit which may be removed from the carriage and replaced with another unit having more or less tubes or having tubes which are sized differently or placed in different geometric patterns. Each of the tubes is adapted to hold an elongated cylinder of food or other item to be sliced and deposited on a passing base. The food in each of the tubes is supported by the product support plate 186, FIG. 11 when the tube assembly is in its at-rest or start position.

Figure 14:
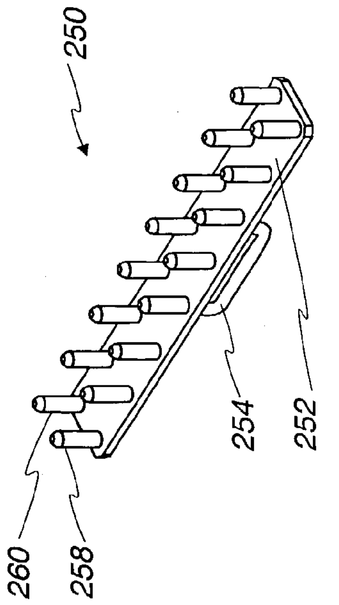
FIG. 14 is a bottom isometric view of the connector of the slicing apparatus.

The drive assembly 22 includes an enclosure 222, an electrical connector 224, a precision motion generator in the form of a servomotor 226, a gear box 228 containing a group of gears 229 (shown diagrammatically), an extending output shaft 230, a connected link or crank 232, a cam 234 and a cam follower 236. The crank has a first end portion 238 attached to the shaft 230 and a second extended end portion 240 attached to the cam 234. The cam is in the form of a roller. Beneath the drive assembly is the cam follower 236 in the form of a plate having a slot 241 in which the roller travels pushed against the slot wall 243. The cam follower plate has side grooves 242, 244 for receiving the guide rails 192, 194, just like the bottom panel 204 of the tube assembly, and a series of holes 248 at its downstream end that match the series of holes 220 in the upstream end of the bottom panel 204. The series of holes 220 of the tube assembly 20 is parallel to the series of holes 248 of the cam follower plate 236. This allows a connector 250 to be used to quickly engage and disengage the tube assembly and the cam follower plate. The connector 250 includes a top plate 252, FIGS. 10 and 14 with a handle 254 extending in one direction and two parallel lines of pins 258, 260 extending in the opposite direction. One line of pins 258 is engageable with the series of holes 248 in the cam follower plate 236 as shown in FIG. 13. The other line of pins 260 is engageable with the series of holes 220 in the tube assembly.

Connecting the cam follower plate 236 to the tube assembly 20 allows the two elements to move together when the cam roller 234 moves in response to rotation of the servomotor 226. Removing the connector 250 is easily done by gripping the handle and pulling the pins away from the two series of holes. This is usually done when the slicing apparatus is to be cleaned or when a tube assembly change is needed. All variation of tube assemblies have the same series of upstream holes and the rail receiving side grooves so as to be totally interchangeable. As can now be appreciated, a change of the tube assemblies, or simply the removal of a tube assembly may be accomplished in a few seconds. Downtime of the apparatus is minimized and cleaning is facilitated. Once the tube assembly is removed, it can be efficiently cleaned. The cam follower plate may be made of Delrin and the connector may be made of stainless steel. A protective shield 259 is attached to the upstream slanted surfaces of the carriage walls 180,182.

The tube assembly and the cam follower plate are movable along the guide rails of the carriage in response to rotational motion of the servomotor. The motion of the servomotor is transmitted through the gears and from there to the crank. Since a servomotor is extremely precise, any signal sent to the servomotor will result in a precise rotational movement of the servomotor. This rotation is precisely magnified by the gears. Any precision motion generator may be used although a servomotor is preferred. The rotational motion is transmitted along the crank to the roller cam. Since the roller cam is confined within the slot of the cam follower plate, where the wall surrounding the slot acts as a cam follower surface, the rotational movement of the servomotor is translated into linear motion in a direction parallel to the guide rails. This causes the tube assembly to move along a path parallel to but above the path of the wire conveyor belts on which ride the bases that receive the sliced food or other items from the food tubes.

Major advantages of the disclosed apparatus are its compact size, simple structure, ease of cleaning and efficient operation. Even though the apparatus is capable of handling pizzas as large as sixteen inches in diameter, the footprint of the apparatus is less than seventy-one inches along the line of travel of the food product and less than forty-nine inches wide. One reason that the footprint is so small is the drive system 22. The drive system includes the servomotor rotating its shaft one way and then back with the motion being enhanced through the gears. The enhanced motion is transferred to the crank which has an eight inch dimension from an axis of rotation to the center of the cam roller. The crank is constrained to rotate through an arc of about one hundred fifty four degrees.

Figure 15:
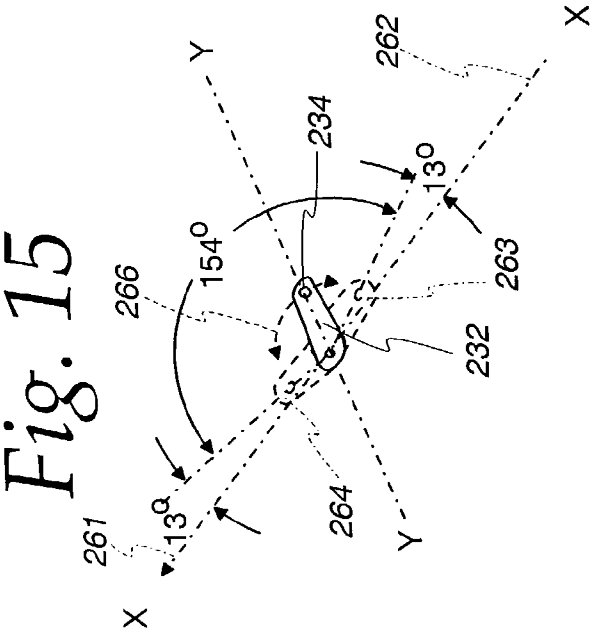
FIG. 15 is a diagrammatic isometric view of the motion of a crank of the drive system on an x-y coordinate system.

The far end of the crank 232 is connected to the cam roller 234 that rides in the cam follower slot 241 of the plate 236. Thus, in this arrangement rotational motion of the motor is transformed into linear motion of the cam follower plate and the connected tube assembly. Referring to FIG. 15, a diagrammatic view of crank movement is illustrated superimposed on an x-y coordinate system. The x-y coordinates are arranged to have the same atitude as the exploded view of FIG. 10 where the x-axis 261 of the coordinates is parallel to the direction of the conveyor belts and of any pizza movement represented by the arrow 262. To slice and deposit food product, like pepperoni, on a sixteen inch pizza base that is moving down the conveyor system at a velocity of about sixty inches per minute, the tube assembly 20 must move at the same velocity for a linear distance of about fifteen inches. To accomplish this feat, the crank must accelerate from a start position 263 (thirteen degrees above the x-axis) to a velocity equal to that of the conveyor system and then decelerate to zero at the end of travel 264 (also thirteen degrees above the x-axis but one hundred fifty four degrees away from the start position) before returning to the start position 263 in time to move forward again when the next pizza comes along on the conveyor system.

The electronic control 28 has been programmed to accelerate the tube assembly once a sensor 265, FIG. 10 signals that a pizza has arrived at a predetermined location so as to give the tube assembly time to accelerate while the pizza continues to move at a constant velocity. After reaching a velocity equal to the velocity of the pizza, the pepperoni is sliced and deposited "on target," that is, deposited on the pizza in the desired pattern. The tube assembly is then stopped and quickly returned to the starting position. It must be noted that even though the tube assembly is moving linearly along the x-axis, the cam 234 is moving along an arc 266. Thus, the electronic program must match the component of cam velocity that is parallel to the x-axis only, and not total velocity, with the velocity of the conveyor. Therefore, the rotational velocity of the crank will constantly vary for the velocity component of the cam in the direction of the x-axis to be constant and equal to the constant velocity of the pizza.

The above described drive system occupies a very small space to achieve a relatively long stroke for the crank. It is to be understood, that the drive system may be scaled up or down as a function of the size of the pizza or other product on the conveyor system, the pattern to be deposited, the anticipated velocity of the conveyor, the width of the apparatus and like factors that impact on the size and movement of the drive system. Furthermore, the program may be altered if a different size pizza is to be run on the conveyor.

The carriage 18 is pivotally connected to a bolt (not shown) in the upstream portion 16 of the frame 12 at a pivot bushing 270, FIGS. 5 and 10. This connection allows the carriage to pivot between a closed position shown in solid line in FIG. 3 to an open position shown in broken outline. Attached to the downstream portion of the carriage is a latch and slice thickness adjustment system 271, FIGS. 3 and 5. The system includes slide blocks 272, 274, FIGS. 5, 10, 16 and 17. Each slide block includes two horizontally disposed slots 276, 278 which are used to mount the blocks to the studs 196, 198, FIG. 10, on the carriage 18 to allow the blocks to move horizontally. Beneath the two horizontal slots are an open vertical slot 280 and an inverted L-shaped slot 282 which is open at one end 284 and includes an enlarged opposite end 286 separated by an upraised lip 288. An engagement element such as the latch assembly 290, FIG. 18, and part of the latch and slice thickness adjustment system 271, includes a handle 292, a shaft 294 to which the handle is mounted and two oppositely disposed pins 296, 298 extending parallel to the shaft and being mounted on arms 300, 302. Another engagement element in the form of a thickness adjustment assembly 304, FIGS. 5, 7, 19 and 20, and also part of the latch and slice thickness adjustment system 271, includes a handle 308 affixed to a shaft 310, where the shaft has two off center portions 312, 314 which act as cams, and a gauge plate 316 for fine tuning. A lock 318 is provided to constrain the thickness adjustment assembly once it is set.

Figure 16:
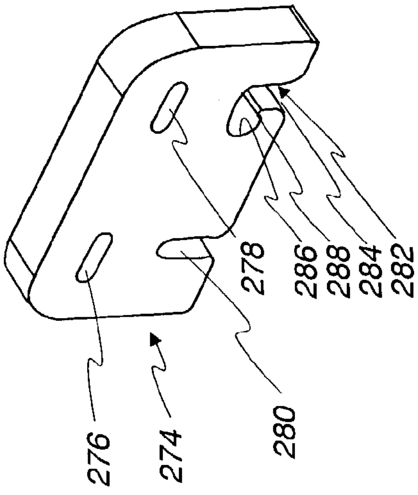
FIG. 16 is an isometric view of a slide block.
Figure 18:
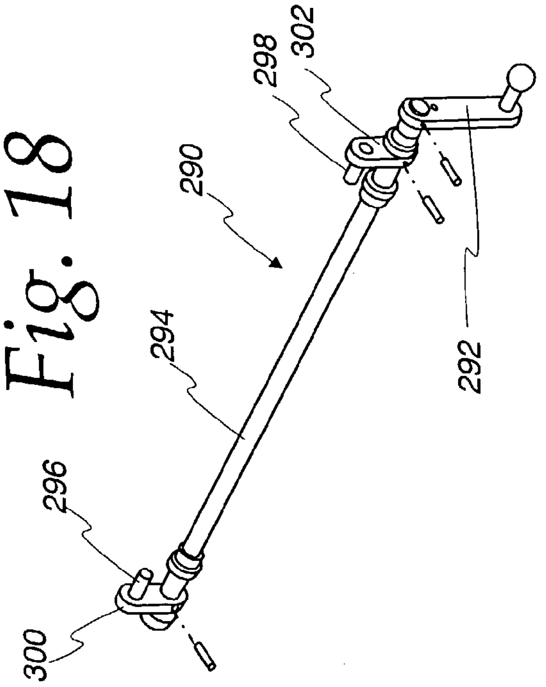
FIG. 18 is an isometric view of a latching shaft.
Figure 17:
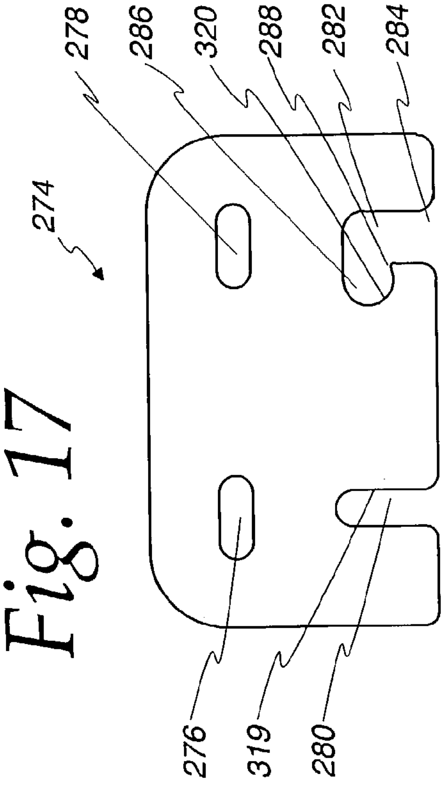
FIG. 17 is a front elevation of the slide block.
Figure 20:
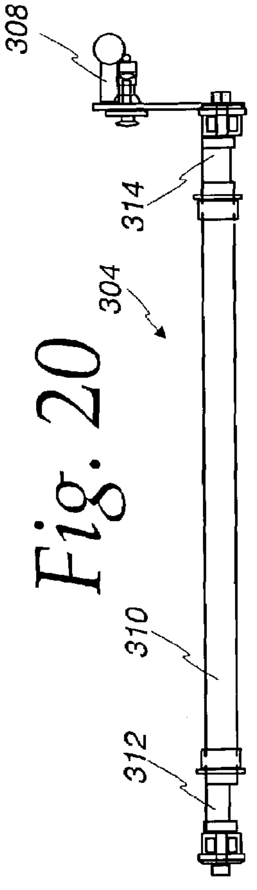
FIG. 20 is a side elevation view of the thickness adjustment shaft.
Figure 22:
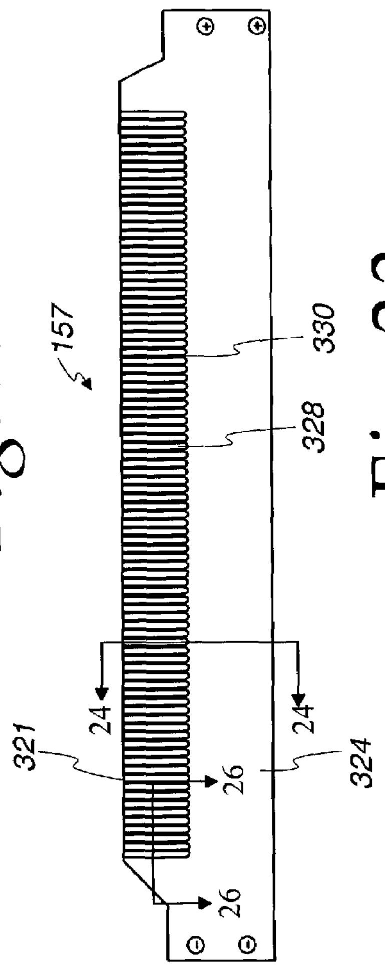
FIG. 22 is a bottom plan view of the blade guide.
Figure 23:
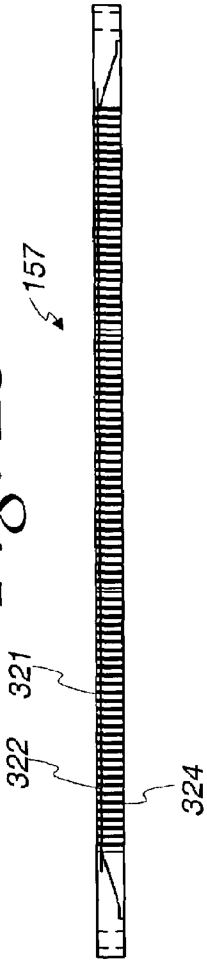
FIG. 23 is a front elevation view of the blade guide.
Figure 19:
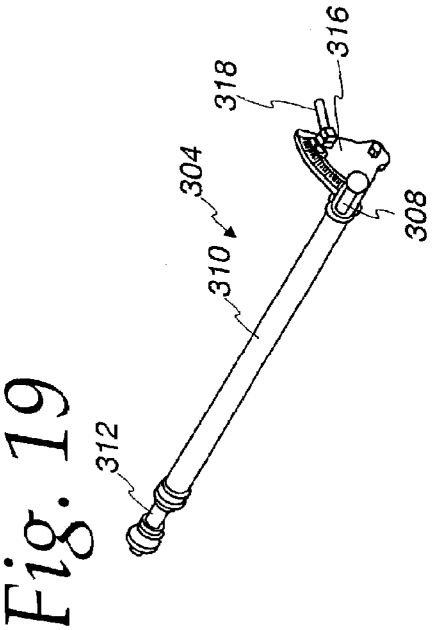
FIG. 19 is an isometric view of a thickness adjustment shaft.
Figure 21:
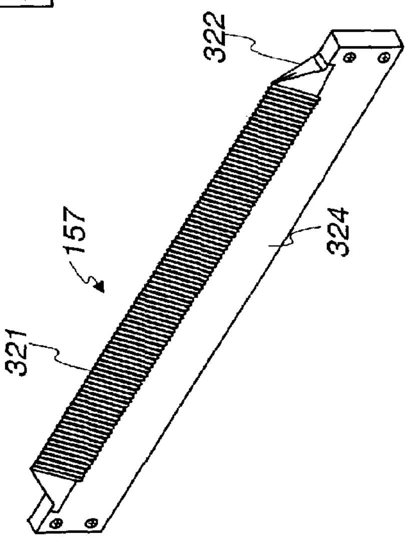
FIG. 21 is a bottom isometric view of a blade guide.
Figure 24:
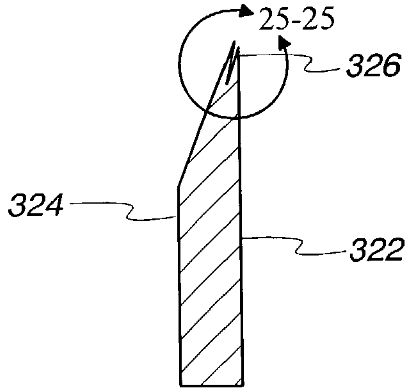
FIG. 24 is an enlarged section view of the blade guide taken along line 24—24 of FIG. 22.
Figure 25:
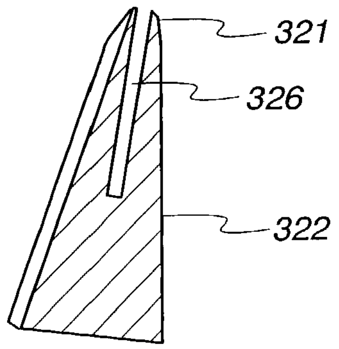
FIG. 25 is an enlarged front end portion of the blade guide taken within circle 25—25 of FIG. 24.
Figure 26:
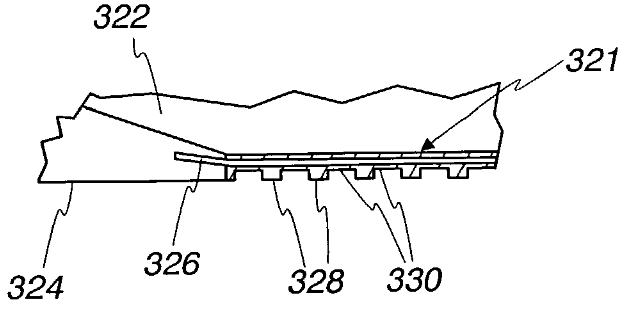
FIG. 26 is an enlarged sectional view taken along line 26—26 of FIG. 22.

When the carriage is in its closed, latched position, as shown in FIG. 1, the open vertical slot 280, FIGS. 16 and 17 on each of the blocks receives a pin, such as the pin 296, of the latch assembly 290, FIG. 18. The inverted L-shaped slot 282 receives an off center cam of the thickness adjustment shaft assembly 304, FIG. 19, such as the off center cam 312. The carriage is locked to the frame when the handle 292 of the latch assembly 290 causes the pins 296, 298 to move clockwise, as viewed in FIG. 18, against the wall 319 of the vertical slots 280, FIG. 17. This causes the blocks to slide rightward, as viewed in FIG. 17. The rightward movement forces the off center cam portions 312, 314 of the thickness adjustment assembly 304 to pass over the lips 288 of the inverted L-shaped slots 282 and into the enlarged end portions 286. Thereafter, movement of the handle 308 on the thickness adjustment assembly 304 causes the cams 312, 314 of the shaft 310 to bear against the wall 320 of the enlarged portion 286 of the inverted L-shaped slot 282, thereby causing the carriage 18 to pivot upwardly or downwardly relative to the frame 12. The thickness adjustment assembly 304 is mounted on the support plates 86, 88, FIGS. 5 and 6, which are welded to the three mounting rods 81, 82, 84. The latching assembly 290, FIG. 18, is mounted on the walls 77, 79 of the frame near the thickness adjustment assembly for ease of handling.

Referring now to FIGS. 20–26, the blade guide 157 is shown in more detail. The guide is a generally rectangular, solid bar with a tapered front end portion 321. The front end portion includes a top surface 322, a bottom surface 324 and an oblilquely directed slot 326. The slot receives the slicing blade 36. The bottom surface includes a series of channels, or plateaus 328 and valleys 330, disposed in a direction parallel to that of the conveyor belt movement. The blade and the blade guide are oriented with the front end portion facing in an upstream direction. Product to be sliced approaches the front end portion of the blade guide with the product being transported by the tube assembly 20. The blade moves across the wire conveyor belt perpendicular to the direction of conveyor belt travel and just above the bases carried by the wire belts of the conveyor system. After the blade slices a product, such as pepperoni, the sliced food passes along the bottom surface 324 and is guided by the bottom surface downwardly toward the moving base. As mentioned earlier, it is important for the sliced food to maintain the pattern on the base as was predetermined by the pattern of the tubes 202 themselves. This is elegantly done by the series of alternating plateaus 328 and valleys 330. A thin slice of food typically will bend or curl somewhat after being cut. When this happens, an edge of the cut food product will become entrapped in one of the valleys causing the adjoining plateau to act as a guide thereby forcing the cut food to be move parallel to the movement of the base and conveyor so as to be deposited in generally the right location on the base. Without a guide the fast moving blade imparts a lateral force to each cut food product. This tends to move the cut food product in the direction of the moving blade, namely, perpendicular to the direction of the moving base. The alternating plateaus and valleys minimizes such lateral movements. The blade guide is formed of corrosion resistant tool steel.

Figure 2:
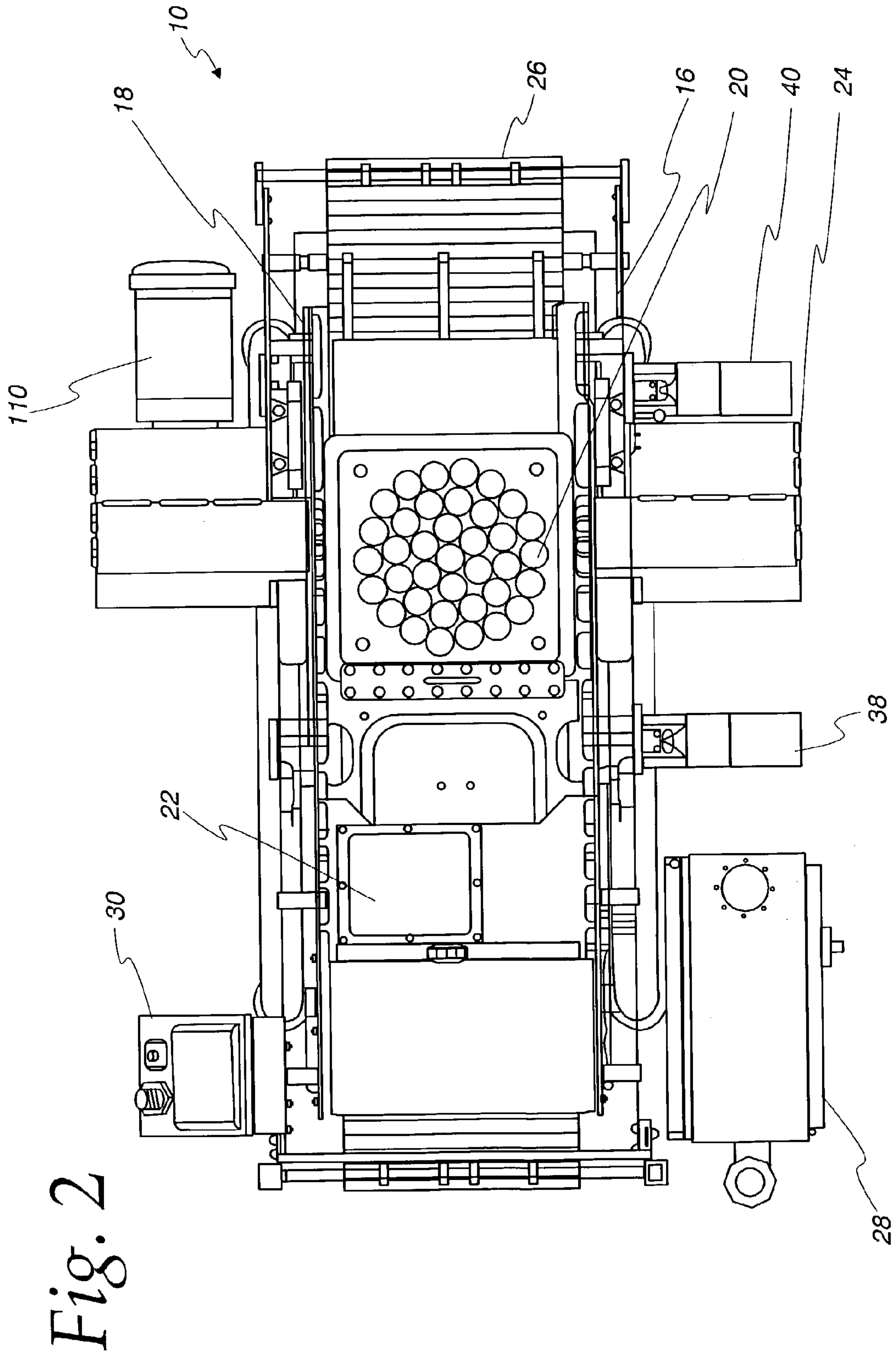
FIG. 2 is top plan view of the slicing apparatus.
Figure 3:
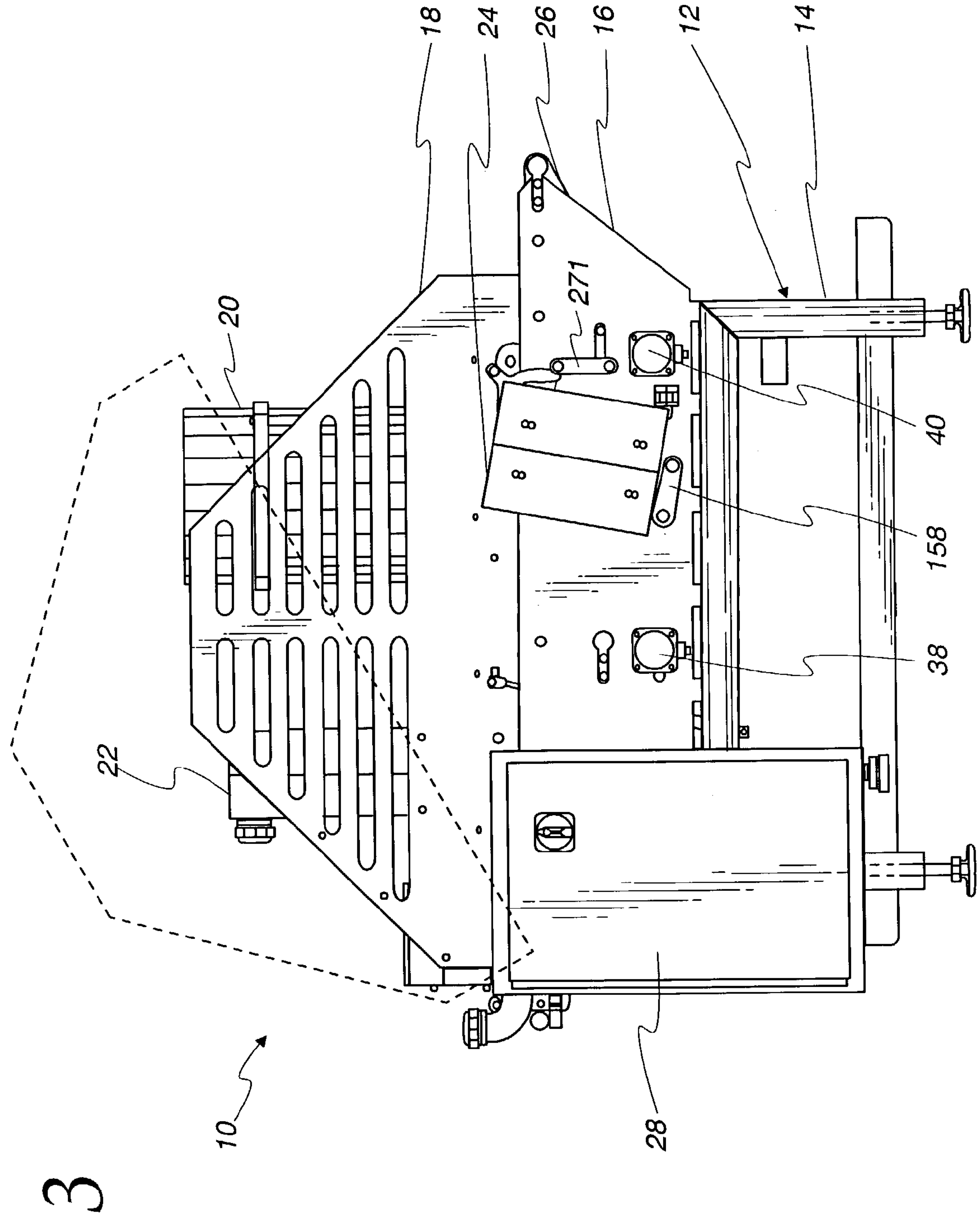
FIG. 3 is a side elevation view of the slicing apparatus showing a carriage in a lowered position (in solid line) and in a raised position (in broken outline).
Figure 4:
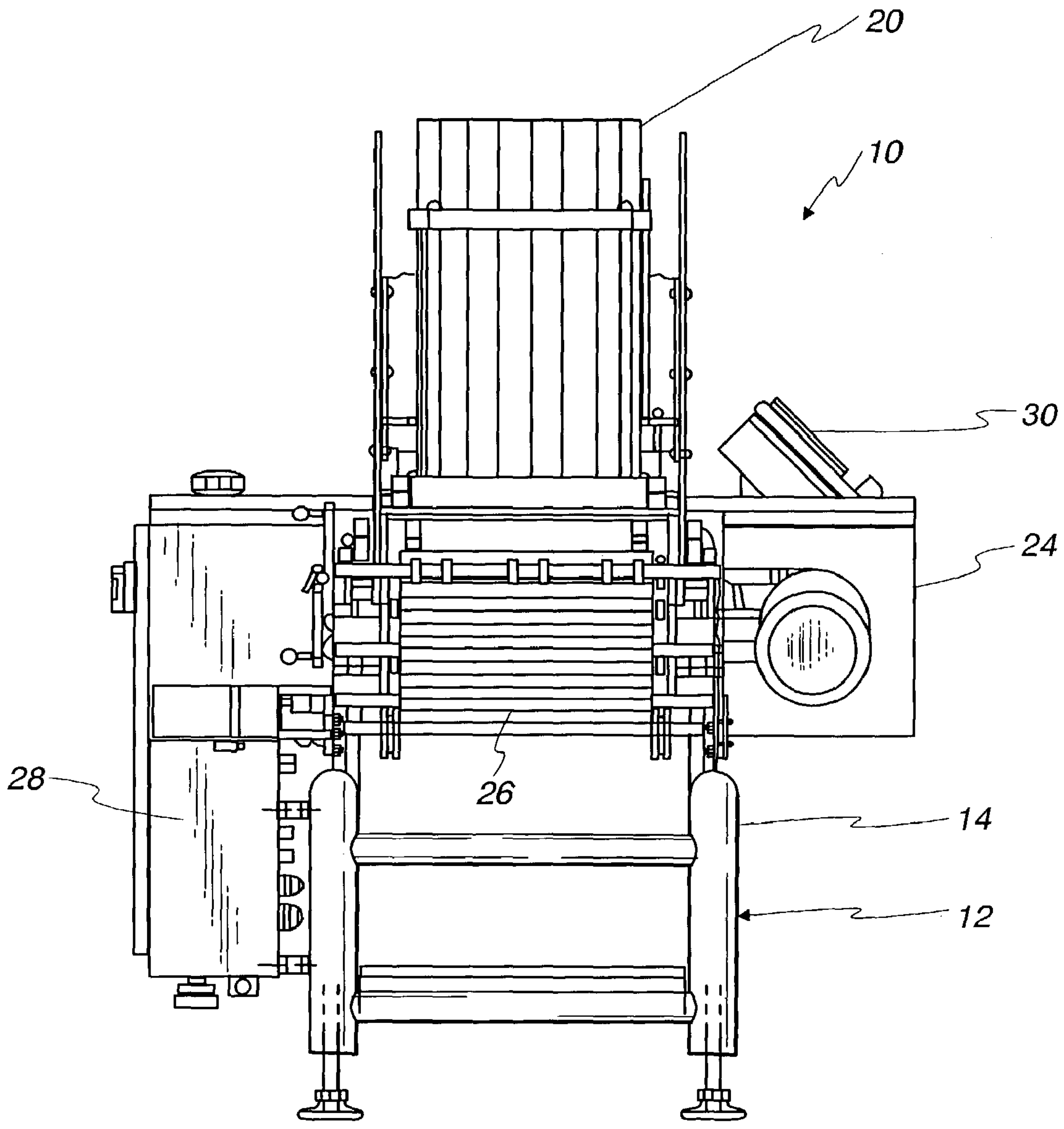
FIG. 4 is a front elevation view of the slicing apparatus.

Referring now to FIGS. 27–32, more details of the cutting blade system 24, FIG. 1, are disclosed. Referring to FIGS. 1 and 2, the cutting blade system is mounted across and to each side of the frame. Specifically, the cutting blade system is mounted on the three parallel rods 81, 82, 84, FIG. 7 welded to the frame. The blade 36 rotates around a driver pulley or drum 334, FIGS. 27, 28 and 29, and a driven drum or pulley 336, FIGS. 30 and 31. The driver drum 334 is part of an assembly 335 and is attached to the motor 110 and to a mounting frame assembly 338. The frame assembly 338 is fastened to the three rods by fasteners 335, 337, 339 so that the driver drum is fixed in position. A cover 112 is placed over the driver drum and mounting frame assembly.

The driven drum 336 is part of an assembly 337 and is mounted to a slide frame assembly 340 which is also mounted on the three parallel rods 81, 82, 84 so as to slide relative to the three rods. The driven pulley 336, part of a blade tensioning system, is attached to the slide frame assembly so as to move toward and away from the side wall 79 of the frame. A bracket 344 is rigidly attached to the ends of the rods by three fasteners 341, 343, 345. A pin 346 is threadedly engaged at one end to the slide frame 340 and moves back and forth with the slide frame. The pin 346 moves through an opening 348 in the bracket. A cylindrical insert 350 is also threaded to the pin 346 at its other end and is placed within a cylindrical opening 352 of a rotatable and pivotable handle 354. When the handle is pivoted about the insert 350, an outer surface 356 of the handle 354 acts as a cam because of the differing radius from an axis of rotation 358 to the outer surface 356. This outer surface bears against a surface 360 of the bracket 344 and moves the slide frame 340 and the drum 336 through the pin 346 placing the blade in greater or lesser tension. In addition, the handle is rotatable on an axis 362 coincident with the longitudinal axis of the threaded pin 346. When this is done, the handle is moved away from or toward the fixed bracket 344 to allow for fine adjustment of the relationship between the handle 354 and the bracket 344.

In operation, the slicing apparatus is part of a food processing assembly line, and, in the case of processing frozen pizza, the slicing apparatus may be the third station. Usually, a circular pizza dough forms the base and is placed on a conveyor system. At a first station, sauce is deposited on the dough base. The base is then conveyed to a cheese depositing stations and from there, the base may proceed to the slicing apparatus for pepperoni and/or other toppings. The processed pizza is then boxed and frozen.

At the slicing apparatus the pizza arrives and is centered by the infeed guide. As the pizza proceeds on the conveyor system, the sensor signals the electronic program which starts the drive system to accelerate the tube assembly to match the velocity of the passing pizza. As the food tube assembly passes the slicing blade a thin slice of topping is cut and deposited on the pizza in a predetermined pattern.

The slicing apparatus is made primarily of stainless steel and synthetic resin and to a large extent the stainless steel is welded together. This construction makes the apparatus easy to clean and maintain. To facilitate cleaning, parts of the apparatus, such as the tube assembly, may be quickly removed. The quick disconnect also allows different sizes and shapes of tube assemblies to be exchanged for versatility purposes since different size pizzas, with different toppings patterns, can be accommodated.

The slicing apparatus has a relatively small footprint and can be set up in small areas. The apparatus is also efficient and reliable and allows for easy adjustment.

The activation box 30 includes an on/off button and the electronic program control 28 includes the program to cycle the apparatus as each conveyor borne pizza base is sensed. It should be noted that both the activation box and the program control may be mounted elsewhere than on the frame, if convenient. For example, it may prove convenient not to expose the program control or the control box to water and a cleaning solution and therefore these items may be mounted in another room or behind a shield.

The above specification describes in detail the preferred embodiment of the present invention. Other examples, embodiments, modifications and variations will, under both the literal claim language and the doctrine of equivalents, come within the scope of the invention defined by the appended claims. For example, the program control and the activation box may be mounted away from the frame. Furthermore, different shapes may be used for the frame and the carriage. More or less pins may be used on the connector 250 and the number of openings on the cam follower plate 236 and the tube assembly 200 may be the same or more than the number of pins. The precision motor may be a servomotor and different programs may be created to cycle the operation of the slicing apparatus. These are all considered to be equivalent structures. Further, they will come within the literal language of the claims. Still other alternatives will also be equivalent as will many new technologies. There is no desire or intention here to limit in any way the application of the doctrine of equivalents nor to limit or restrict the scope of the invention.

The Invention claimed is:

1. A drive system for a food slicing apparatus comprising:

a precision motion creator;

gears operatively connected to said motion creator;

a link having first and second end portions, said first end portion being operatively mounted to said gears;

a cam element mounted to said second end portion of said link;

a cam follower element including a slot for receiving said cam element; and a quick connect and disconnect connector for engaging said cam follower element and a food transporting assembly.

2. The apparatus as claimed in claim 1 wherein:

said cam follower element includes a connector opening; and said connector includes pins for engaging said opening of said cam follower element and an opening in the food carrier assembly.

3. The apparatus as claimed in claim 2 wherein:

said cam follower element includes oppositely disposed grooves to facilitate mounting on guide rails.

4. The apparatus as claimed in claim 3 wherein:

said motion creator accelerates said cam follower element to a predetermined velocity and thereafter decelerates said cam follower element.

5. A slicing apparatus for a product processing line comprising:

a frame;

a conveyor system mounted to said frame, said conveyor system for forming a first path along which bases move;

a cutting blade mounted on structure for moving generally perpendicular to said first path;

a tube assembly connected to said frame for moving along a second path parallel to and above said first path and for moving items to be sliced passed said cutting blade;

a compact drive system connected to said tube assembly for moving said tube assembly, said drive system including a precision motion generator and a connected crank; and a control system for cycling said drive system in a predetermined manner; and wherein said drive system includes a group of gears, a cam and a cam follower plate, said gears being driven by a servomotor;

said crank has first and second end portions, said first end portion being operatively mounted to said gears;

said cam being mounted to said second end portion of said crank; and said cam follower plate having a slot for receiving said cam.

6. The apparatus as claimed in claim 5 including:

a quick connect and disconnect connector engaging said tube assembly and said drive system.

7. The apparatus as claimed in claim 5 including:

a connector having a plurality of pins; and wherein pin receiving holes are formed in said tube assembly and in said drive system.

8. A drive system for a food slicing apparatus, where said apparatus includes a conveyor system for moving a series of bases, a pair of rails and a control system, said drive system comprising:

a precision motion creator located above said conveyor system:

gears operatively connected to said motion creator;

a link having first and second end portions, said first end portion being operatively mounted to said gears;

a cam mounted to said second end portion of said link;

a cam follower movable along said pair of rails, said cam follower including a slot for receiving said cam; and a connector for engaging said cam follower and a food transporting assembly, said food transporting assembly also being movable along said pair of rails whereby food product transported by said food carrier assembly is deposited upon said moving bases.

9. The apparatus as claimed in claim 8 wherein:

said motion creator causes said cam follower and said food transporting assembly to move at the same velocity as the bases on said conveyor system.

10. The apparatus as claimed in claim 9 wherein:

said motion creator accelerates and decelerates said cam follower, said food transporting assembly and said connector.

11. A slicing apparatus for a product processing line comprising:

a frame;

a conveyor system mounted to said frame, said conveyor system for forming a first path along which bases move;

a cutting blade mounted to move across said first path;

a tube assembly connected to said frame to move along a second path parallel to and above said first path and to move items to be sliced passed said cutting blade;

a compact drive system connected to said tube assembly to move said tube assembly; and a control system to cycle said drive system in a predetermined manner; wherein said drive system includes a motor, a crank connected to the motor, and a plate having a slot with a predetermined geometry;

said crank includes first and second end portions, said first end portion being operatively connected to said motor and said second end portion being connected to a cam; and said cam is disposed in said slot and is restrained to move in a predetermined manner wherein said tube assembly is moved above said first path in a predetermined manner.

12. A slicing apparatus for a product processing line comprising:

a frame;

a conveyor system mounted to said frame, said conveyor system for forming a first path along which bases move;

a cutting blade mounted to structure to enable said blade to move across said first path;

a tube assembly connected to said frame to move along a second path parallel to and above said first path and to move items to be sliced passed said cutting blade;

a drive system connected to said tube assembly and positioned compactly above said cutting blade to move said tube assembly along said second path; and a control system for cycling said drive system in a predetermined manner wherein said drive system includes a motor, a crank connected to said motor, a cam connected to said crank and a plate with a slot dimensioned to received said cam, and wherein said motor, said cam, said crank and said plate are positioned above said cutting blade.

13. The apparatus as claimed in claim 12 including:

a connector positioned between said plate and said tube assembly, said connector being positioned above said cutting blade.

14. The apparatus as claimed in claim 13 wherein:

said plate includes connector openings; and said connector includes a first group of pins for engaging said openings of said plate and a second group of pins for engaging a food carrier assembly.

15. The apparatus as claimed in claim 13 wherein:

said slot is of predetermined geometry for causing said plate to move in a predetermined manner.

* * * * *